(12) United States Patent
Degenhardt

(10) Patent No.: US 12,092,512 B2
(45) Date of Patent: Sep. 17, 2024

(54) METHOD FOR MEASURING THE VIBRATION BEHAVIOUR OF A DRIVETRAIN OF A TURBOSET COMPRISING A GENERATOR IN A POWER PLANT CONNECTED TO AN ENERGY SUPPLY NETWORK

(71) Applicant: Siemens Energy Global GmbH & Co. KG, Bayern (DE)

(72) Inventor: Achim Degenhardt, Erlangen (DE)

(73) Assignee: Siemens Energy Global GmbH & Co., KG, Munich (DE)

( * ) Notice: Subject to any disclaimer, the term of this patent is extended or adjusted under 35 U.S.C. 154(b) by 238 days.

(21) Appl. No.: 17/784,008

(22) PCT Filed: Dec. 14, 2020

(86) PCT No.: PCT/EP2020/086023
§ 371 (c)(1),
(2) Date: Jun. 9, 2022

(87) PCT Pub. No.: WO2021/122476
PCT Pub. Date: Jun. 24, 2021

(65) Prior Publication Data
US 2023/0017585 A1    Jan. 19, 2023

(30) Foreign Application Priority Data
Dec. 17, 2019  (DE) .............. 10 2019 219 857.0

(51) Int. Cl.
*G01H 1/10*  (2006.01)
*G01H 13/00*  (2006.01)
*H02P 9/10*  (2006.01)

(52) U.S. Cl.
CPC .............. *G01H 1/10* (2013.01); *G01H 13/00* (2013.01); *H02P 9/10* (2013.01)

(58) Field of Classification Search
CPC .......... G01H 1/003; G01H 1/10; G01H 13/00; H02P 29/50; H02P 9/10
See application file for complete search history.

(56) References Cited

U.S. PATENT DOCUMENTS

| 4,393,345 A | 7/1983 | Fork et al. |
| 4,996,880 A | 3/1991 | Leon et al. |

(Continued)

FOREIGN PATENT DOCUMENTS

| DE | 2945599 A1 | 5/1981 |
| DE | 69024206 T2 | 7/1996 |

(Continued)

OTHER PUBLICATIONS

IEEE Standards Association, IEEE Guide for Identification, Testing, and Evaluation of the Dynamic Performance of Excitation Control Systems, IEEE Std 421.2-2014 (Year: 2014).*

(Continued)

*Primary Examiner* — David L Singer
(74) *Attorney, Agent, or Firm* — Wolter Van Dyke Davis, PLLC

(57) ABSTRACT

A method for measuring the vibration behaviour of a drivetrain of a turboset including a generator in a power plant connected to a power network, includes: a) selecting exciter signals, wherein the frequency spectrum extends significantly beyond the frequency range usual from the commissioning of pendulum damping devices, b) influencing the field current of the generator using the exciter signals such that mechanical vibrations are excited in the power plant turboset, c) measuring the excited mechanical vibrations including the resonance vibrations by measuring at least one suitable output variable, d) determining a transfer function from the exciter signal to the output variable measured, and e) determining the transfer function from the generator torque at a desired output variable using known transfer (Continued)

functions of the exciter signal at a desired input variable and/or of the desired output variable for the output variable measured on the basis of the transfer function determined.

14 Claims, 4 Drawing Sheets

(56) References Cited

U.S. PATENT DOCUMENTS

| | | | |
|---|---|---|---|
| 5,251,155 | A | 10/1993 | Adachi |
| 5,677,852 | A | 10/1997 | Juhlin |
| 6,407,548 | B1 | 6/2002 | Dietz |
| 2005/0193821 | A1 | 9/2005 | Hurley et al. |
| 2009/0179663 | A1 | 7/2009 | Hobelsberger |
| 2009/0230681 | A1* | 9/2009 | Scholte-Wassink .... F03D 7/045 290/44 |
| 2012/0139243 | A1* | 6/2012 | Koerber .................. H02P 9/007 290/44 |
| 2013/0257166 | A1 | 10/2013 | Chen et al. |
| 2016/0254769 | A1* | 9/2016 | Ren ........................ H02P 9/105 290/44 |
| 2016/0290320 | A1* | 10/2016 | Deng ...................... H02P 21/22 |
| 2017/0254696 | A1 | 9/2017 | Balkowski et al. |
| 2018/0316294 | A1* | 11/2018 | Fox ........................ H02P 9/105 |

FOREIGN PATENT DOCUMENTS

| | | |
|---|---|---|
| DE | 69306127 T2 | 6/1997 |
| DE | 19903627 A1 | 8/2000 |
| EP | 2990609 A1 | 3/2016 |
| EP | 3396848 A1 | 10/2018 |

OTHER PUBLICATIONS

Zadehkhost, Pouya Sajjad et al.: "Analyzing subsynchronous torsional interactions in large-scale power systems in frequency domain." In: 2017 IEEE Power, Energy Society Innovative Smart Grid Technologies Conference (ISGT), 2017, pp. 1-5.

Giesecke, Hans D.: Steam turbine-generator torsional response due to interaction with the electrical grid. In: 2012, IEE Power and Energy Society General Meeting, 2012, pp. 1-6.

Crastan, Valentin; "Elektrische Energieversorgung/Electrical energy supply" 3. 2. updated edition. Berlin Heidelberg: Springer, 2018., pp. 71-158. Chapter 3 [English abstract attached].

PCT International Search Report and Written Opinion of International Searching Authority mailed Apr. 9, 2021 corresponding to PCT International Application No. PCT/EP2020/086023 filed Dec. 14, 2020.

* cited by examiner

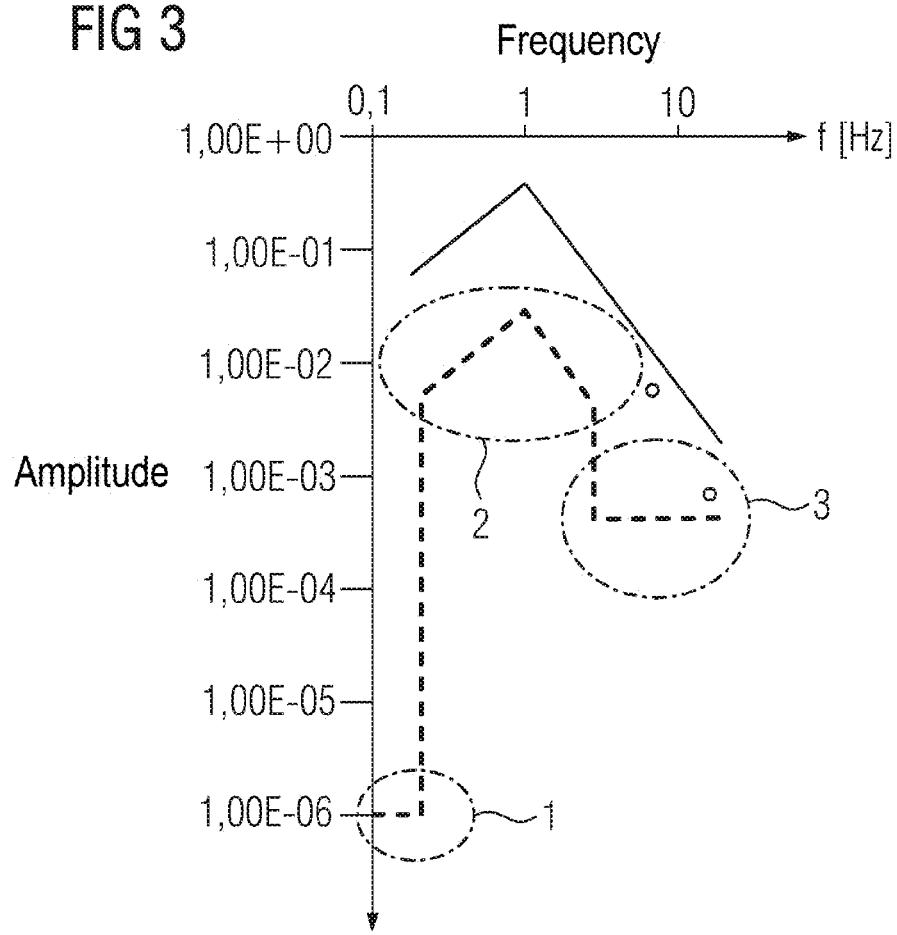
Amplitude spectrum of the active power

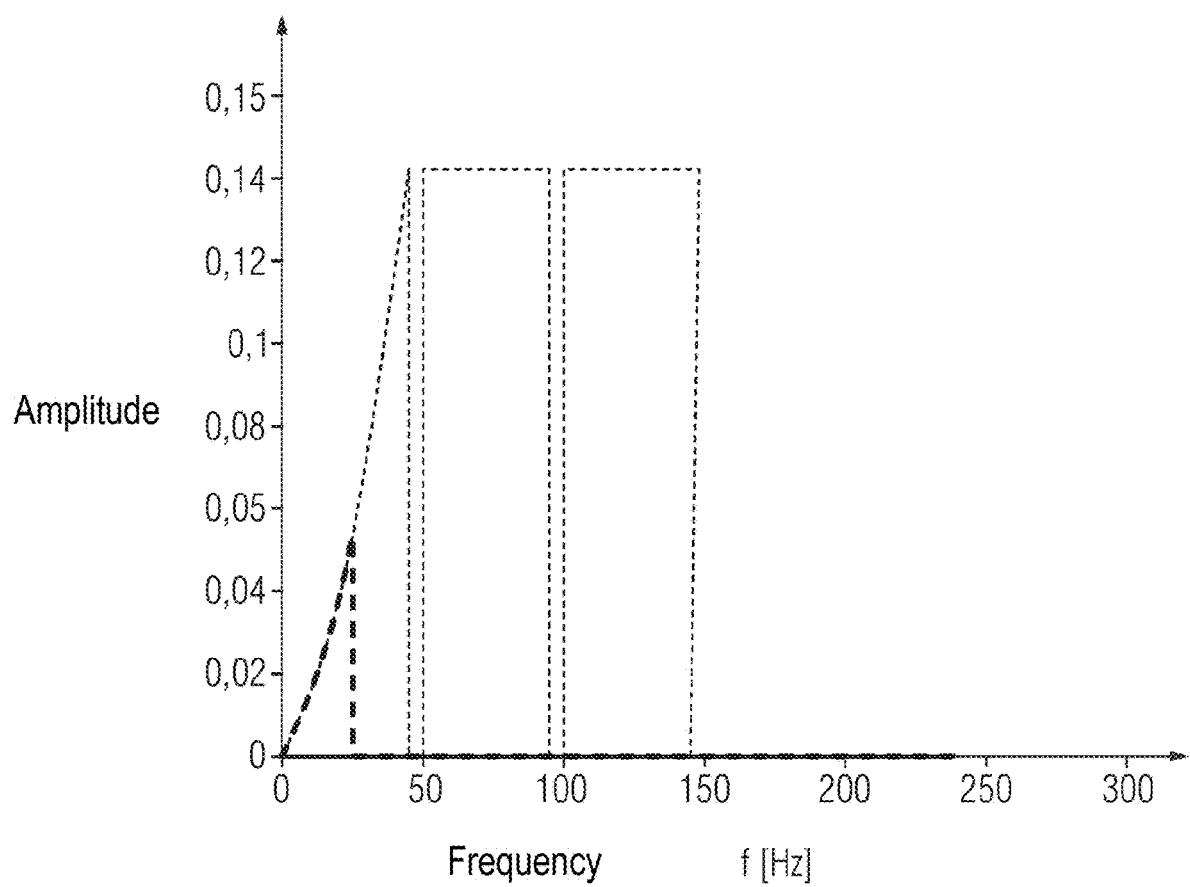
Amplitude spectrum of the excitation signal

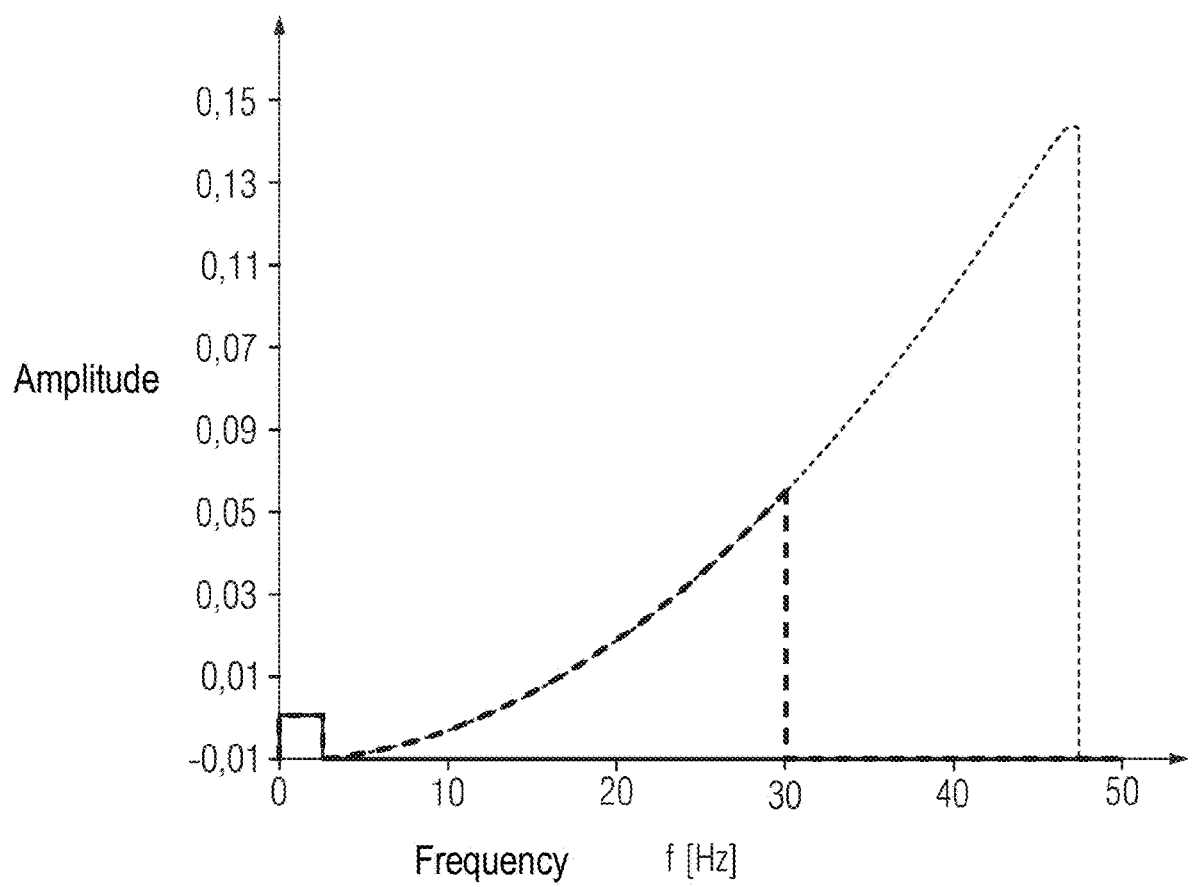

METHOD FOR MEASURING THE VIBRATION BEHAVIOUR OF A DRIVETRAIN OF A TURBOSET COMPRISING A GENERATOR IN A POWER PLANT CONNECTED TO AN ENERGY SUPPLY NETWORK

CROSS REFERENCE TO RELATED APPLICATIONS

This application is the US National Stage of International Application No. PCT/EP2020/086023 filed 14 Dec. 2020, and claims the benefit thereof. The International Application claims the benefit of German Application No. DE 10 2019 219 857.0 filed 17 Dec. 2019. All of the applications are incorporated by reference herein in their entirety.

FIELD OF INVENTION

The invention relates to a method for measuring the vibration behavior of a drivetrain of a turboset comprising a generator in a power plant connected to an energy network.

BACKGROUND OF INVENTION

Turbosets of gas, steam or combined cycle power plants connected to an energy network comprise, as main components, a shaft, one or more turbines as a prime mover and a generator as a working machine. If the generator is confronted with a sudden rapid active load change caused, for example, by switching operations or short circuits, so-called rotor oscillations, during which the rotor angle is changed to its new value caused by the new load state, can occur during the balancing operation. However, the new rotor angle is not established immediately. Rather, on account of the inertia of the rotor, it oscillates around its new final value with decreasing amplitude. The oscillation is effected in this case at the natural frequency of the drivetrain, which may have an adverse effect on the stability of the generator. The generator is therefore normally assigned an oscillation damping device which forms part of the control loop of the generator and is often integrated in the control software of the generator. During so-called isolated operation of the generator, the voltage controller is used to keep the terminal voltage constant in the case of different loads of the generator. During so-called network operation of the generator, it is used to provide a variable reactive power in the case of a certain active load of the generator. It influences the terminal voltage and/or the power factor of the generator via the excitation current. Depending on the operating mode, a target voltage value is formed for the control loop and is specified to the controller. Depending on the design, the oscillation damping device uses the generator speed and/or generator power variables to generate an additional signal which is added to the target voltage value. It reacts to dynamic changes in its input signals, which signify a balancing operation of the generator with respect to a new operating point, and temporarily changes the target voltage value. The progression of the active power of the generator during a balancing operation is ultimately influenced and rotor oscillations are damped using the target generator voltage value, the voltage controller, the subordinate excitation current and the voltage induced in the generator.

In order to be able to optimally influence a generator, oscillation damping devices for the respective generator must be adjusted as part of the activation of the turboset. For this purpose, the generator torque present during load operation is varied during the first activation or during reactivation following maintenance. The variation can be effected most simply by influencing the field current using the field voltage. The field voltage is in turn set by the voltage controller using the excitation device. In this case, the field voltage is firmly predefined during manual operation and, during controller operation, is used as a target terminal voltage value for controlling the terminal voltage. In both cases, a variation can be effected by means of a temporally variable offset with respect to the field voltage to be output. Alternatively, the target terminal voltage value can be varied during controller operation. In all cases, the excitation signal can be generated in the voltage controller and fed in via an external signal source. In principle, different excitation signals are conceivable, for example noise signals with different frequency spectra, sweeps or individual excitation signals. The excited vibrations can then be effectively and accurately captured by measuring the active power. On the basis of the excitation signals and the measured active power, a transfer function from the excitation signal to the active power is then created during evaluation, which transfer function is taken as a basis for subsequent control. The excitation and evaluation are fundamentally restricted to the frequency ranges of approximately 0.2 Hz to approximately 2.0 Hz, at most 3.0 Hz, since only the interaction between the power plant and the energy network is of interest for adjusting oscillation damping devices. The uppermost limit of 3.0 Hz is predefined by many network operators in order to prevent harmful effects on the energy network. In addition, the influence of frequencies greater than 3.0 Hz is also restricted, however, by the transfer function of the excitation signal control loop and by the field winding of the generator which tends to considerably damp higher frequencies.

In order to safely operate a power plant, it is also necessary to know the behavior of the shaft train during excitation by torsional moments during ongoing operation, in particular the exact location of the eigenmodes. The dominant, usually subsynchronous natural torsional frequencies of the shaft train often have a sharp characteristic and are subject to low natural damping. If an imbalance between the drive torque of the turbine(s) and the output torque of the generator is produced during operation of the power plant, for example as a result of a mechanical failure or as a result of load fluctuations in the network, this automatically results in balancing operations which generate, in the generator gap, an electrical generator counter-torque, the frequency of which is usually below the nominal frequency of the generator. If the frequency of the generator counter-torque is close to a subsynchronous natural torsional frequency of the shaft train, the shaft train can be excited to strong resonant vibrations. These resonant vibrations in turn induce, in the stator of the generator, subfrequency currents which are fed back into the network. In the case of little or even negative damping of the electrical and mechanical overall system, the torsional vibrations of the shaft train can be excited further, which results in impermissibly high loads of the shaft train which may in turn entail a reduction in the service life or even failure of the turboset. Accordingly, the torsional eigenmodes must be determined in order to be able to avoid them during operation of the power plant. Attempts to measure the torsional eigenmodes on the rotating shaft train by feeding in torques at the main excitation machine have not been successful to date since the torques fed in were too low. Accordingly, the torsional eigenmodes are currently determined computationally on the basis of models.

SUMMARY OF INVENTION

Proceeding from this prior art, it is an object of the present invention to provide an alternative method for measuring the vibration behavior of a drivetrain of a turboset comprising a generator in a power plant connected to an energy network.

In order to achieve this object, the present invention provides a method for measuring the vibration behavior of a drivetrain of a turboset comprising a generator in a power plant connected to an energy network, wherein the method has the steps of: a) selecting excitation signals, in particular in the form of voltage signals, wherein the frequency spectrum contains frequencies of up to at least 15 Hz, advantageously up to at least 97 Hz, better still up to at least 147 Hz, and therefore considerably goes beyond that frequency range which is customary for activating oscillation damping devices (normally approximately 0.2 Hz to approximately 3.0 Hz), b) influencing the field current of the generator using the excitation signals selected in step a) in such a manner that mechanical vibrations are excited in the power plant turboset, c) capturing the excited mechanical vibrations, including the resonant vibrations, by measuring at least one suitable output variable, in particular the active power, d) computationally determining a transfer function from the excitation signal to the output variable measured in step c), and e) computationally determining the transfer function from the generator torque to a desired output variable using known transfer functions from the excitation signal used in step b) to a desired input variable and/or from the desired output variable to the output variable measured in step c) on the basis of the transfer function determined in step d).

The practice of carrying out steps a) to c) and determining the transfer function from the excitation signal (voltage signal) to the at least one output variable (measured active power) in step d) is fundamentally known for the purpose of setting up an oscillation damping device, as already described at the outset, except that the frequency range of the excitation signals has hitherto been limited to frequencies of up to a maximum of approximately 3.0 Hz. In the method according to the invention, the frequency range comprises much higher frequencies of up to at least 15 Hz, advantageously up to at least 97 Hz, better still up to at least 147 Hz, and therefore makes it possible to capture the torsional eigenmodes in step c). In step e), a further transfer function from the generator torque to a desired output variable, for example to the active power, is then calculated. This further transfer function can be used to describe the behavior of the power plant over the entire frequency range of the selected excitation signals as well as the interaction between the power plant and the oscillation damping device. The captured torsional modes can be used to confirm/check simulation models. In addition, they can be incorporated in the control of the generator, thus considerably increasing the reliability of the power plant.

The excitation signals are advantageously signals with different frequency components having different amplitudes, wherein the amplitudes are selected taking into account previously known amplitude limit values of the output variable measured in step c).

The measured output variable is advantageously the active power. The devices needed for this are already present in existing power plants, with the result that no additional devices for carrying out the method according to the invention are needed to measure the output variable.

The previously known amplitude limit values are advantageously limit values which are predefined by an excitation system and/or by a network operator and/or were previously determined on the basis of a simulation of the power plant turboset and/or the mechanical train.

The amplitudes of the excitation signals are advantageously adapted in a frequency-dependent manner to the possibilities of the excitation device, the generator and/or the shaft train and/or to the requirements of the remaining power plant and/or to the requirements of the energy network, taking into account the amplification produced by the subsequent section. Accordingly, negative effects on the power plant and/or on the energy network are avoided when carrying out the method.

According to one configuration of the method according to the invention, the frequency spectrum of the excitation signals does not have any frequencies which are in the range of the resonant frequencies of the network and/or in the range of other critical frequencies of the network. This also prevents dangerous excitations while carrying out the method.

The excitation signals are advantageously combined in one or more noise signals, thus reducing the period of time needed to carry out the method.

According to one variant of the method according to the invention, the generator field current is influenced in step b) via the generator field voltage in the case of static excitation and via the excitation voltage in the case of brushless excitation, which is in turn indirectly influenced via a voltage controller, wherein the excitation signals provided in the form of voltage signals are used as target terminal voltage values in the voltage controller.

Alternatively, the field current is influenced in step b) via the generator field voltage in the case of static excitation and via the excitation voltage in the case of brushless excitation, which is in turn directly influenced by additively applying the excitation signals provided as voltage signals to the output of a voltage controller or replacing the voltage controller output signal with said excitation signals.

The desired output variable in step e) is advantageously the speed of the generator and/or torques which occur at one or more points in the shaft train.

BRIEF DESCRIPTION OF THE DRAWINGS

Further features and advantages of the present invention become clear on the basis of the following description of an embodiment of the method according to the invention with reference to the accompanying drawing, in which

FIG. 3 shows an enlarged view of the graph shown in FIG. 2 in the frequency range of 0.1 Hz to approximately 15 Hz;

FIG. 4 shows a graph showing the excitation signal amplitude spectrum which is needed to achieve the desired active power amplitude spectrum illustrated in FIG. 2; and FIG. 5 shows an enlarged view of the graph shown in FIG. 4 in the frequency range of 0 Hz to 50 Hz.

DETAILED DESCRIPTION OF INVENTION

Figure 1:
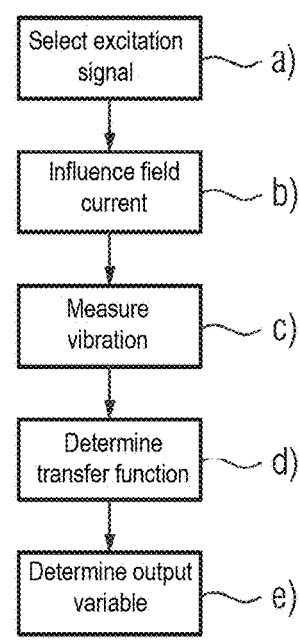
FIG. 1 shows a flowchart schematically showing the steps of a method according to one embodiment of the present invention.

FIG. 1 shows a flowchart of a method according to the invention for activating a turboset comprising a generator in a power plant connected to an energy network. In a first step a), excitation signals are selected, in the present case in the form of voltage signals, wherein the frequency spectrum for capturing the torsional eigenmodes comprises frequencies in the range of 0.2 Hz, for example, to 147 Hz, for example, and therefore considerably goes beyond the frequency range customary for the activation of oscillation damping devices. A particular challenge in this case is adapting the amplitude spectrum for different frequencies. A concept was devised for this purpose and is described below with reference to FIGS. 2 to 5 using the example of an existing power plant.

Figure 2:
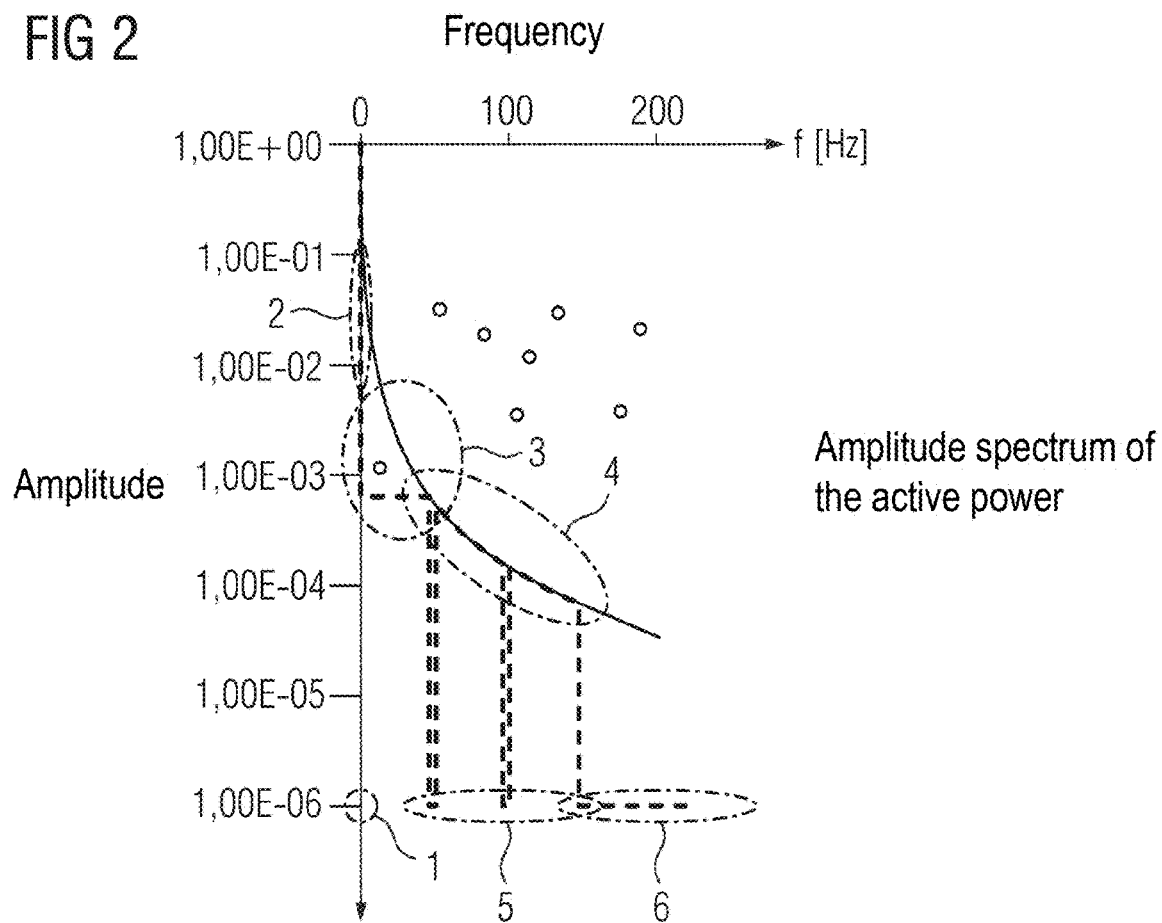
FIG. 2 shows a graph showing, by way of example, the selection of a desired active power amplitude spectrum.

FIGS. 2 and 3 show the amplitude spectrum of the active power, wherein the frequencies are plotted on the X axis and the amplitudes are plotted on the Y axis. The solid line represents amplitude limit values predefined by the excitation system, the dashed line represents amplitude limit values predefined by electrical requirements of the power plant and of the energy network, and the hollow dots represent mechanical amplitude limit values of the shaft train on account of torsional modes. These amplitude limit values are known.

By way of example, the following requirements were imposed on the selection of the excitation signals in accordance with the requirements of an individual system:
1) No excitation signals below 0.2 Hz.
2) 1% excitation signal in the frequency range of 0.2 Hz to 3.0 Hz.
3) A maximum 0.041% oscillation amplitude of the active power oscillations at all frequencies above 3.0 Hz.
4) A maximum 14% excitation signal at all frequencies above 3.0 Hz.
5) No excitation signals at integer multiples of 50 Hz±2.5 Hz.
6) No excitation signal above 150 Hz.

The dash-dotted line in FIGS. 2 and 3 represents the amplitude spectrum of the active power which results according to these six requirements, wherein the individual requirements are marked in the graph by means of corresponding numbers.

FIGS. 4 and 5 show the amplitude spectrum of the excitation signal which is needed, purely computationally, to achieve the amplitude spectrum of the active power illustrated in FIGS. 2 and 3, wherein the excitation signals are plotted on the X axis and the excited amplitudes are plotted on the Y axis. The three spectra up to 3 Hz (solid line), up to 30 Hz (dashed line) and up to 147 Hz (thin dashed line) make it possible to increase the frequency range in a stepwise manner. In this case, the first step up to 3 Hz corresponds to a transfer function measurement, as known from the activation of oscillation damping devices.

In step b), the field current of the generator is influenced using the excitation signals selected in step a) in such a manner that mechanical vibrations are excited in the power plant turboset. In this case, the excitation signals are combined in one or more noise signals. According to a first variant, the generator field current can be influenced via the generator field voltage or the excitation voltage which is in turn indirectly influenced via a voltage controller, wherein the excitation signals provided in the form of voltage signals are used as target terminal voltage values in the voltage controller. Alternatively, according to a second variant, the field current can be influenced via the generator field voltage or the excitation voltage, which is in turn directly influenced by additively applying the excitation signals provided as voltage signals to the output of a voltage controller and replacing the voltage controller output signal with said excitation signals.

In step c), the excited mechanical vibrations, including the resonant vibrations, are then captured by measuring at least one suitable output variable which is the active power in the present case.

In a further step d), a transfer function from the excitation signal to the active power measured in step c) is computationally determined in a known manner.

In the final step e), a transfer function from the generator torque to a desired output variable, which is likewise the active power in the present case, is computationally determined. Alternatively, the desired output variable may also be, however, the speed of the generator or torques which occur at one or more points in the shaft train. This transfer function is calculated using known transfer functions from the excitation signal used in step b) to a desired input variable and/or from the desired output variable to the output variable measured in step c) on the basis of the transfer function determined in step d). It should be clear that a plurality of transfer functions may also be determined in step e).

Although the invention has been described and illustrated more specifically in detail by means of the exemplary embodiment, the invention is not restricted by the disclosed examples and other variations can be derived therefrom by a person skilled in the art without departing from the scope of protection of the invention.

The invention claimed is:
1. A method for measuring vibration behavior of a drivetrain of a turboset comprising a generator in a power plant connected to an energy network, wherein the method comprises:
   a) selecting excitation signals, wherein a frequency spectrum of the selected excitation signals contains frequencies of up to at least 15 Hz,
   b) influencing a field current of the generator using the excitation signals selected in step a) in such a manner that mechanical vibrations are excited in the turboset,
   c) capturing the excited mechanical vibrations, including resonant vibrations, by measuring at least one suitable output variable,
   d) computationally determining a transfer function from the excitation signal to the output variable measured in step c), and
   e) computationally determining the transfer function from a generator torque to a desired output variable using known transfer functions from the excitation signal used in step b) to a desired input variable and/or from the desired output variable to the output variable measured in step c) on the basis of the transfer function determined in step d).
2. The method as claimed in claim 1,
   wherein the excitation signals are signals with different frequency components having different amplitudes, and
   wherein the amplitudes are selected taking into account previously known amplitude limit values of the output variable measured in step c).
3. The method as claimed in claim 2,
   wherein the measured output variable is active power.
4. The method as claimed in claim 2,
   wherein the previously known amplitude limit values are limit values which are predefined by an excitation system and/or by a network operator and/or were previously determined on the basis of a simulation of the turboset and/or a mechanical train.

5. The method as claimed in claim 2, wherein the amplitudes of the excitation signals are adapted in a frequency-dependent manner to possibilities of an excitation device, the generator and/or a shaft train and/or to requirements of the remaining power plant and/or to the requirements of the energy network, taking into account amplification produced by the subsequent section.

6. The method as claimed in claim 1, wherein the frequency spectrum of the excitation signals does not have any frequencies which are in the range of resonant frequencies and/or in the range of other critical frequencies of the network.

7. The method as claimed in claim 1, wherein the excitation signals are combined in one or more noise signals.

8. The method as claimed in claim 1, wherein the field current is influenced in step b) via a generator field voltage in the case of static excitation and via an excitation voltage in the case of brushless excitation, which is in turn indirectly influenced via a voltage controller, wherein the excitation signals provided in the form of voltage signals are used as target terminal voltage values in the voltage controller.

9. The method as claimed in claim 1, wherein the field current is influenced in step b) via a generator field voltage in the case of static excitation and via an excitation voltage in the case of brushless excitation, which is in turn directly influenced by additively applying the excitation signals provided as voltage signals to the output of a voltage controller or replacing the voltage controller output signal with said excitation signals.

10. The method as claimed in claim 1, wherein an active power of the generator is measured as a suitable output variable in step c).

11. The method as claimed in claim 1, wherein the desired output variable in step e) is a speed of the generator and/or torques which occur at one or more points in a shaft train.

12. The method as claimed in claim 1, wherein the excitation signals are in the form of voltage signals.

13. The method as claimed in claim 1, wherein the frequency spectrum of the selected excitation signals contains frequencies of up to at least 97 Hz.

14. The method as claimed in claim 1, wherein the frequency spectrum of the selected excitation signals contains frequencies of up to at least 147 Hz.

* * * * *